(12) United States Patent
Hunt (10) Patent No.: US 6,352,605 B1
(45) Date of Patent: Mar. 5, 2002

(54) METHOD OF MAKING THREE-DIMENSIONAL LAMINATED STRUCTURES

(75) Inventor: John F. Hunt, Madison, WI (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/419,648

(22) Filed: Oct. 18, 1999

(51) Int. Cl.[7] ............................... B31F 1/00; B31F 5/00
(52) U.S. Cl. .................. 156/211; 156/222; 156/263
(58) Field of Search .................. 428/132; 156/211, 156/222, 252, 253, 256, 257, 263, 322, 182, 268, 226, 227; 493/374, 382, 347, 334, 350, 356, 344, 379, 390, 393, 394, 964; 242/118.8

(56) References Cited

U.S. PATENT DOCUMENTS

| | | |
|---|---|---|
| 1,849,270 A | 3/1932 | Bolger |
| 2,363,425 A | 11/1944 | Klein |
| 2,493,562 A | 1/1950 | Yarman |
| 3,673,057 A * | 6/1972 | Fairbanks .................. 156/256 |
| 3,675,692 A | 7/1972 | Jeans |
| 3,793,791 A * | 2/1974 | Wootten .................... 156/252 |
| 3,838,602 A | 10/1974 | Hanson et al. |
| 3,853,286 A | 12/1974 | Beder et al. |
| 3,876,073 A | 4/1975 | Herbetko |
| 4,435,237 A | 3/1984 | Hoelzinger |
| 4,492,350 A | 1/1985 | Dgetluck |
| 4,610,355 A | 9/1986 | Maurer |
| 5,022,943 A | 6/1991 | Zaima |
| 5,472,540 A | 12/1995 | Marschke et al. |
| 5,513,819 A | 5/1996 | Orange |
| 5,609,557 A | 3/1997 | Te |
| 5,643,384 A | 7/1997 | Okabe |
| 5,735,483 A | 4/1998 | Bierlein |
| 5,746,871 A | 5/1998 | Walsh |

OTHER PUBLICATIONS

SUS–RAP Packaging Web page, published by Menasha Corporation, Danville, PA.

* cited by examiner

Primary Examiner—Jeff H. Aftergut
Assistant Examiner—Barbara J. Musser
(74) Attorney, Agent, or Firm—Bullwinkel Partners (57) ABSTRACT

A three-dimensional laminated structure and method for making same are provided. The method involves die-cutting a plurality of sheets, including cutting through the sheets around part of the periphery of selected sections, aligning and bonding the sheets, and forming the selected sections out-of-plane with a forming tool.

7 Claims, 9 Drawing Sheets

METHOD OF MAKING THREE-DIMENSIONAL LAMINATED STRUCTURES

STATEMENT REGARDING GOVERNMENT RIGHTS

The U.S. Government is the owner of this invention.

BACKGROUND

1. Field of the Invention

This patent relates to three-dimensional laminated structural/cushioning products and a method of making same. More particularly, this patent relates to laminated structures that are die-cut and formed into three-dimensional shapes more complex than those of laminated structures made by conventional methods.

2. Description of the Related Art

Numerous methods are known to fabricate paper or paperboard into structural and cushioning products. Two primary methods are (1) die-cutting corrugated paperboard panels and folding and gluing the panels to make corrugated boxes, furniture, pallets, reels, packaging, appliance bases, etc.; and (2) die-cutting paper sheets, then laminating and molding the sheets into flat or curved sections for chair backs, seats, etc.

The method of die-cutting corrugated panels and folding and gluing the panels into structures is well known in the corrugated industry. The corrugated panel typically is made of two or more layers of paperboard in alternating sequence of flat paperboard followed by corrugated paperboard. The corrugated paperboard is used to separate the flat paperboard sheets to increase structural efficiency of the panel by placing more material away from the structure's core. The flat paperboard sheets and corrugated paperboard sheets are bonded together with an adhesive applied to the top and bottom of the corrugations. When bonded together, the sheets form a stiff flat panel.

To produce structural or cushioning articles from the flat panel, the panel is scored along selected lines. The scored lines facilitate folding at specific locations. Folding is accomplished by crushing the corrugated paperboard along the scored lines. After folding the corrugated panel into the desired configuration, overlapping panels may be glued in place.

The basic corrugated "sandwich" structure is maintained on either side of the scored line. The strength of the finished structure may be enhanced with various folds to include perpendicular ribs or to increase the number of flat and corrugated paper layers. In some instances the structure is made by folding the material, then, if needed, the structure can be unfolded back into a flat sheet for shipping or storage.

In making corrugated structures according to this cut-and-fold method, often the folded score lines are not permanently folded. That is, the folded score lines may act as a living hinge that can be worked back and forth.

In some instances wood or structural foam may be inserted into the corrugated paperboard structure for added strength. In such instances the process of making the basic corrugated structure is similar to that just described.

Unfortunately there are numerous disadvantages to these corrugated paperboard structures. First, the bonding between the flat sheets and the corrugated sheets lies only along narrow corrugated ridges, which results in a relatively weak bond and consequently a relatively weak structure. As will be seen, the three-dimensional paper laminate structure of the present invention has no such weakness.

Second, folding a panel of corrugated paperboard is accomplished by scoring or crushing the corrugated flutes along a line, which in some situations decreases the strength of the structure. With three-dimensional paper laminates made according to the present invention, no crushing occurs, even along fold lines, because the laminate layers fold as a unit. Consequently, the strength of the paper laminate is preserved along the fold line.

Third, corrugated paperboard living hinge lines tend to weaken and become prone to shifting as the lines are worked back and forth. By contrast, with three-dimensional paper laminates such as that disclosed herein, the fold line is rigid and is not easily bent back after the adhesive sets. Consequently, the fold lines of the present invention are strong.

Fourth, corrugated panels are prone to buckling under load. The strength of corrugated panels can be increased by increasing the number of layers of corrugated and flat sheets. However, during bending, the maximum stress is carried by the top and bottom paperboard layers. For corrugated panels, the top and bottom layers are only one paper sheet thick and this sheet is prone to buckling under load.

By contrast, with three-dimensional paper laminates such as that taught herein, most of the core paper material is at the surface of the structure. Where two paper laminates are joined to make a two-sided structure, only the die-cut sections are formed into the core of the structure to provide shear transfer and maintain the distance between the planar surfaces of the two paper laminates, while most of the paper laminate material remains at the planar surfaces. Each planar surface typically has more than two layers of paper laminates bonded together which significantly increases structural stiffness. Structural stiffness, defined as the material modulus of elasticity (E) times the area moment of inertia (I), increases as a cubic function of thickness. Thus, a doubling in the thickness of each planar surface increases the stiffness of the planar surface by a factor of eight.

Finally, corrugated paperboard is prone to surface damage from localized impact because the strength at the surface is based on only one layer of flat paperboard and the corrugated paperboard beneath. Paper laminates, on the other hand, are inherently stronger with each additional laminate layer. With paper laminates, localized crushing or damage due to impact can be minimized by increasing the number of paper layers.

The second conventional method of fabricating paper or paperboard into structural and cushioning products—die-cutting paper and then laminating and molding it into flat or curved sections—is best known in the packaging and furniture industries for making pallet components, chair backs and seats, etc. To make a flat or curved laminated paper structure, multiple sheets of paper are die-cut to final or near-final dimensions. A layer of adhesive or thermoplastic polymer is then placed between each paper layer. If the structure is bonded with a setting adhesive, then before the adhesive sets the layers of paper are placed in a curved mold and pressed and held with pressure until the adhesive sets sufficiently for the structure to be removed and the shape maintained. If the structure is bonded with a thermoplastic polymer, either the layers of paper are preheated sufficiently to allow the plastic to shear or flow and then the laminates are placed into a mold and pressed into shape, or heat is applied in the mold to allow the plastic to flow and the mold is then cooled to set the thermoplastic polymer and hold the paper layers in place.

In either bonding method—adhesive or thermoplastic polymer—the laminated structure is generally continuous and has a uniform thickness across the curved shape. The exception to the continuous structure may be the inclusion of holes for screw inserts or access openings for hand-holds or the like.

Like corrugated paperboard structures, there are numerous disadvantages to conventional paper laminates. First, it is often necessary to bond conventional paper laminated shapes to a core material to produce a stress skin that has sufficient stiffness, which increases cost and complexity. By contrast, three-dimensional paper laminates that are die-cut and formed according to the present invention to achieve sufficient stiffness do not require bonding to a core material.

Second, conventional paper laminates can have curvatures, but they cannot have sharp complex curves or shapes. The die-cutting and molding process disclosed herein can produce paper laminates having complex out-of-plane structural and cushioning features.

Finally, it is difficult with conventional paper laminates to make out-of-plane structural features. Conventional paper laminates sometimes have access openings, but these are for functional purposes (eg. hand holds) and not for structural purposes. The present invention provides a noncontinuous planar structure having die-cut areas that are formed (pressed) out-of-plane to make structural features such as struts, flanges, bosses and other reinforcement type features.

Thus it is an object of the present invention to provide a three-dimensional laminated structural/cushioning product and method of making same that eliminates many of the disadvantages of conventional corrugated paperboard and laminated products.

A particular object of the present invention is to provide a laminated product having out-of-plane structural features that are more complex than conventional laminated structures.

Another object of the present invention is to provide a die-cut molded laminated structure with superior strength compared to corrugated structures.

Yet another object of the present invention is to provide a die-cut molded laminated structure that can be designed with specific performance or geometric characteristics that are a function of the laminate material, laminate fiber orientation, strut placement and strut shape.

Further and additional objects will appear from the description, accompanying drawings, and appended claims.

SUMMARY OF THE INVENTION

The present invention is a three-dimensional laminated structure and method for making same. Structures that may be made using the present method include reel flanges, appliance bases, pallets, furniture and packaging articles. The method is similar to the method for making conventional die-cut paper laminate structures, but includes two additional novel steps. The first additional step is to make specific die-cuts into the laminates where the laminate will be formed out-of-plane. The second additional step is to form the out-of-plane features using a punch and die like assembly.

DETAILED DESCRIPTION OF THE INVENTION

The present invention is a three-dimensional laminated structure and method for making same. The method is similar to the method of die-cutting paper laminates known in the art, with two additional steps incorporated into the method. The first additional step is to make specific die-cuts into the laminates where the laminate will be formed (pressed) out-of-plane. The second additional step is to form the out-of-plane features using a punch and die like assembly.

The three-dimensional laminated structure comprises one or more sheets of material that have been laminated and die-cut into a desired shape. The structure has a substantially planar surface and at least one component formed out-of-plane and connected to the planar surface along a rigid fold line. The type of material and the laminate fiber orientation may be varied to achieve desirable characteristics.

Two or more three-dimensional laminated structures may be joined to form a more complex structure, as in the two examples discussed below. Where two three-dimensional laminated structures are joined, the out-of-plane components of one or both three-dimensional laminated structures may be struts or other support-type members. The struts of one three-dimensional laminated structure may be joined to the struts or the planar surface of the other three-dimensional laminated structure.

Structures that may be made using the present method include reel flanges, appliance bases, pallets, furniture and packaging articles. Two particular structures and their components will now be described: a reel flange and an appliance base.

EXAMPLE 1

Reel Flange

Figure 1:
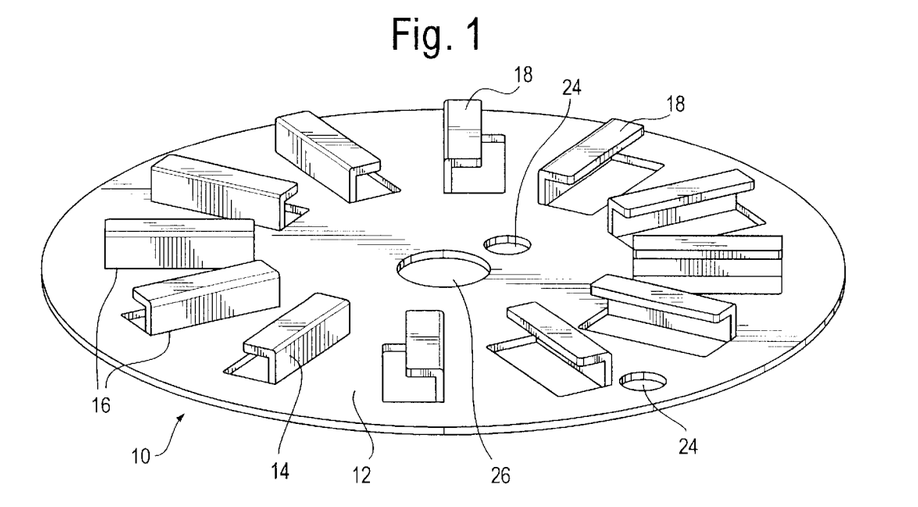
FIG. 1 is a perspective view of a reel flange component made according to the present invention.

Turning to the drawings, there is shown in FIG. 1 one embodiment of a three-dimensional paper laminate structure according to the present invention. The embodiment shown is a reel flange outer member 10. The reel flange outer member 10 is one component of an assembled reel flange 58, as will be described below. The reel flange outer member 10 is made according to a novel process also described in more detail below.

The reel flange outer member 10 has a substantially planar surface 12 and a plurality of struts 14 formed out-of-plane. In the illustrated embodiment, each strut 14 is connected to the planar surface 10 along a rigid fold line 16. Each strut 14 has an additional fold which forms a tab 18 disposed in a predetermined angular relation to the planar surface 12 of the reel flange outer member 10 (ninety degrees in this example). As described below, the tabs 18 are to be bonded to a reel flange inner member 60 to form two of the four components of a completed reel flange 58. Although the struts 14 are evenly distributed in a circular arrangement about the central axis of the reel flange outer member 10, other arrangements are contemplated for other structures, depending on the overall shape of the structure and its desired characteristics.

The reel flange outer member 10 shown in FIG. 1 is made according to the following process. First, a plurality of paper sheets are die-cut into the desired planar shape. An important aspect of the present invention is that specific die-cuts are made around part of the periphery of those sections that will be formed or pressed out-of-plane. Next, the plurality of die-cut sheets are aligned and adhesive or hot melt is applied between the sheets. Third, the aligned sheets are placed in a punch and die like assembly. Before the adhesive or hot melt between the paper sheets sets, the punch and die assembly forms the out-of-plane members, in this case, the struts. Finally, the adhesive or hot melt is allowed to set, resulting in a rigid three-dimensional structure. Multiple three-dimensional structures may be joined to form even more complex structures such as the reel flange 58 shown in FIG. 7 or the appliance base to be described later.

Figure 2:
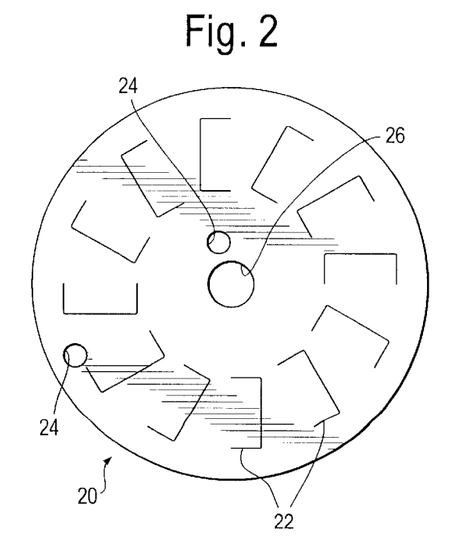
FIG. 2 is a top plan view of a paper sheet die-cut to form the reel flange component of FIG. 1.

FIG. 2 shows a single paper sheet 20 which has been die-cut in preparation for making a reel flange outer member 10. Additional die-cuts 22 are made around part of the periphery of those sections that will be formed out-of-plane to make the struts 14. In the illustrated embodiment two access holes 24 and a center hole 26 have been die-cut from the paper sheet 20. The access holes 24 and the center hole 26 will accommodate guide pins during the forming process.

Figure 3:
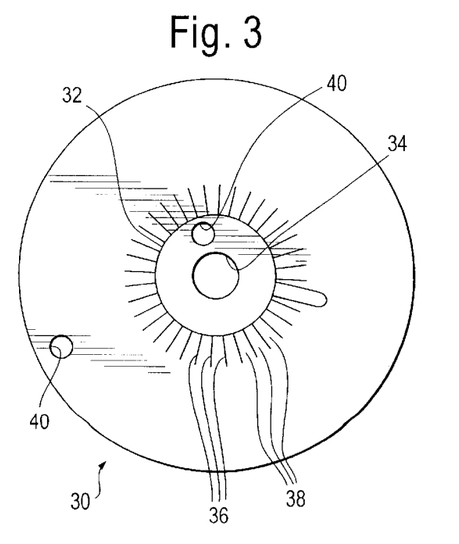
FIG. 3 is top plan view of a second paper sheet die-cut to form second and third reel flange components.
Figure 7:
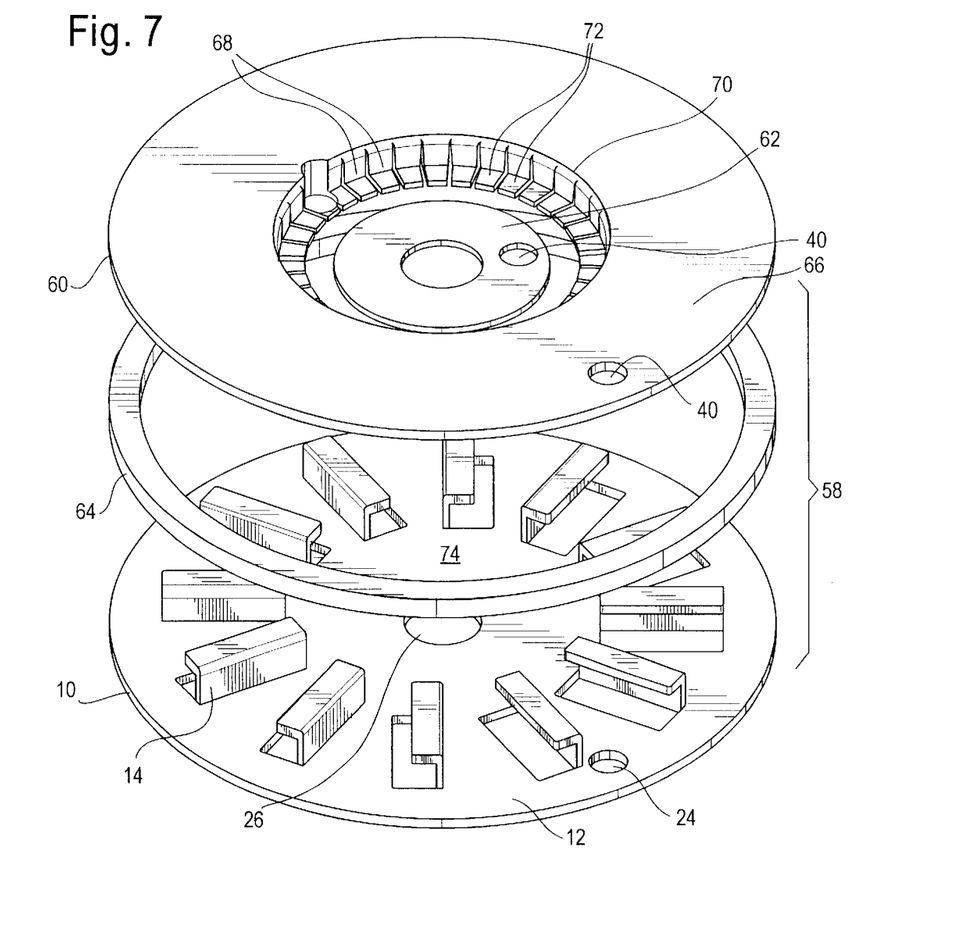
FIG. 7 is an exploded perspective view of a reel flange according to the present invention, showing the four components of the flange, three of which are formed using the method of the present invention.

FIG. 3 shows a second paper sheet 30 die-cut to make the reel flange inner member 60 shown in FIG. 7. A perforated circular die-cut 32 is made in the paper sheet 30 and a central hole 34 is die-cut inside the circular die-cut 32. Partial die-cuts 36 radiate outwardly from the circular die-cut 32. Tabs 38 defined by these partial die-cuts 28 will be pushed out-of-plane during the forming process. Access holes 40 may also be die-cut as needed.

Figure 4:
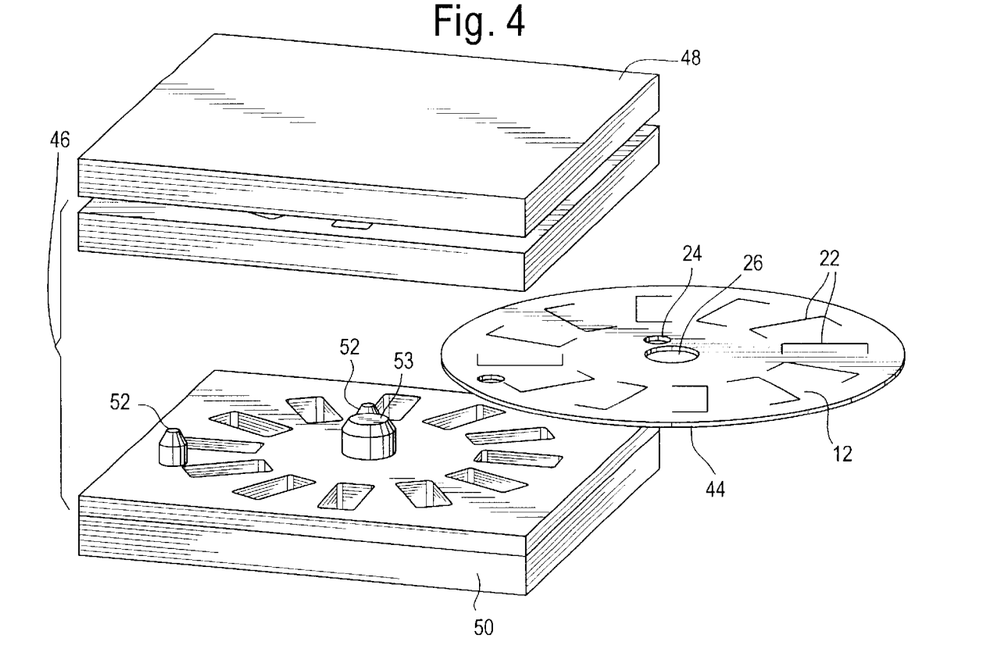
FIG. 4 is schematic of a punch and die like assembly, shown with a laminate prior to placing it in the punch and die assembly.

Referring once again to FIG. 2, after die-cutting, two or more die-cut paper sheets 20 are aligned and adhesive or hot melt is applied between the paper sheets 20. Any number of paper sheets and any paper orientation may be used to achieve the desired thickness and performance characteristics. The aligned and bonded paper sheets 20 form a flat laminate 44 which is placed in a punch and die assembly 46 as shown in FIG. 4. The punch and die like assembly 46 comprises a punch 48 and a die 50. The access holes 24 and the center hole 26 in the flat laminate 44 accommodate the guide pins 52 and the center pin 53 in the die 50.

Figure 5:
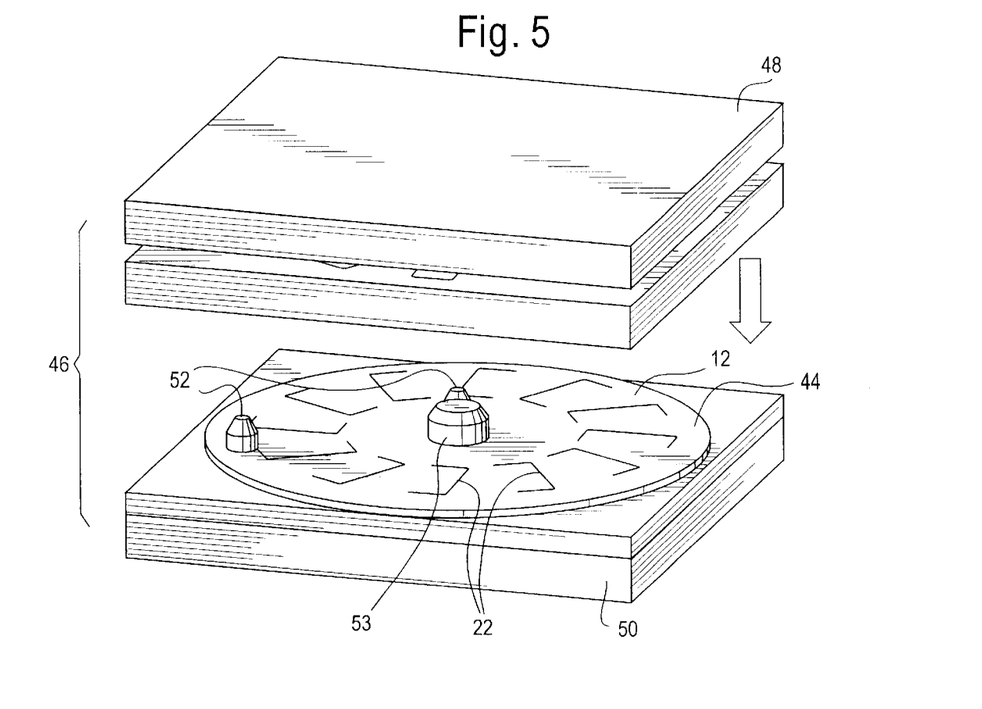
FIG. 5 is a schematic of the punch and die assembly of FIG. 4 after the laminate has been loaded onto the die assembly with the punch assembly closing.

FIG. 5 shows the punch and die assembly 46 after the flat laminate 44 has been mounted onto the die 50 and the punch 48 is beginning to lower. The guide pins 52 and center pin 53 hold the flat laminate 44 in position.

Figure 6:
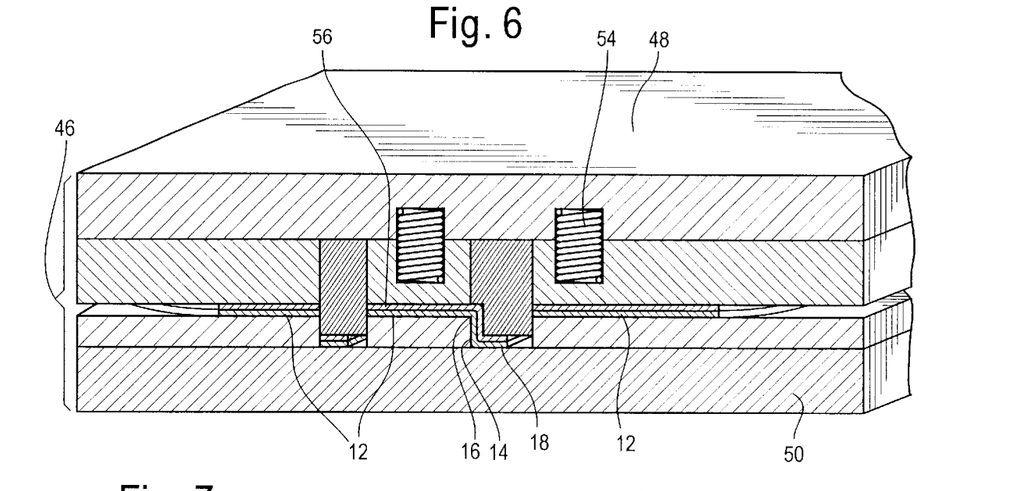
FIG. 6 is a cutaway view of the punch and die assembly after the punch has pushed sections of the paper laminate into the desired out-of-plane positions.

FIG. 6 is a cutaway view of the punch and die assembly 46 after the punch 48 has been lowered on top of the laminate 44. At this point the laminate 44 is no longer flat because the punch 48 has formed the struts 14 out-of-plane. Springs 54 or other biasing means may be used to hold the laminate 44 in position while the punch 48 forms the struts 14 out-of-plane. An optional silicone pad 56 may be attached to the bottom surface of the punch 48 as shown to help provide a more uniform pressure over the entire surface area of laminate 44 while the adhesive or thermoplastic polymer sets.

Figure 9:
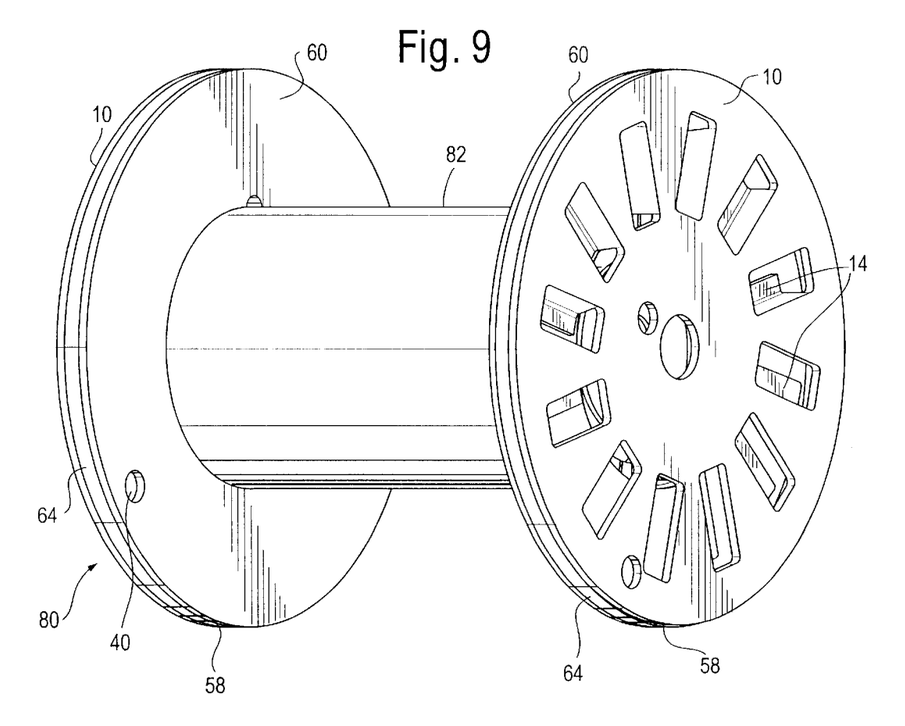
FIG. 9 is a perspective view of a finished reel made with components made according to the present invention.

Pressure from the punch and die assembly 46, and optional heating and cooling, may be used to set the adhesive or hot melt (eg. thermoplastic polymer) between the paper sheets if necessary. The amount of time the punch 48 is in the fully downwardly position depends on the type of adhesive or thermoplastic polymer used. Cooling may also be necessary if a thermoplastic polymer is used. Once removed from the punch and die assembly 46, the laminate 44 is now a finished reel flange outer member 10, ready for assembly into a reel flange 58 and, ultimately, a reel 80 (FIG. 9).

In making the reel flange inner member 60 shown in FIG. 7, the process is repeated, beginning with making multiple die-cut paper sheets 30 as shown in FIG. 3. Of course, a different punch and die like assembly is used to make the different three-dimensional shape of the reel flange inner member 60.

FIG. 7 is an exploded view of a reel flange 58 comprising an outer member 10 (defined as the member away from the reel core) and an inner member 60, each made according to the present invention. In addition to the outer member 10 and inner member 60, the reel flange 58 comprises a reinforcing member 62 and a circumferential member 64. The reinforcing member 62 is a by product of the process for making the inner member 60 and is formed from the perforated circular die-cuts 32 of FIG. 3. The circumferential member 64 may be made from a short length of conventional paper tube.

The inner member 60 has a substantially planar surface 66 and tabs 68 formed by partial die-cuts 36 (FIG. 3) and extending axially outward (away from the reel's cylindrical paper core—see FIG. 8) from a fold line 70. The tabs 68 have an approximately ninety degree bend to form tab end portions 72 which are substantially coplanar with the inner member planar surface 66.

The assembly of the reel flange 58 will now be described. The outer member 10 and the inner member 60 are fitted together such that the outer member strut tabs 18 contact the inner member 60 and the inner member tabs 68 contact the outer member 10. The circumferential member 64 is interposed between the inner member 60 and outer member 10 such that it contacts both the inner member 60 and the outer member 10 around the circumferential edge of the reel flange 58. Adhesive is applied to some or all of the contact areas of the assembled parts. The reinforcing member 62 is bonded to the outer member 10 to reinforce the hub area 74 of the inner member 10. The assembled components thus make up a finished reel flange 58.

Figure 8:
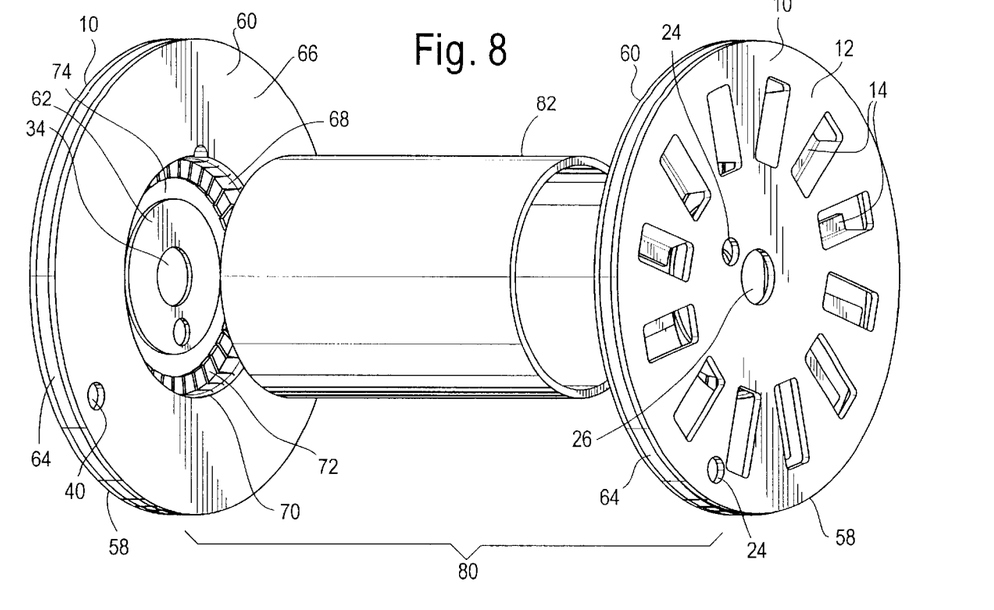
FIG. 8 is an exploded perspective view of a reel, showing two flanges made according to the present invention and a paper tube.

FIG. 8 is an exploded view of a reel 80, showing inside and outside views of a finished reel flange 58. The two identical reel flanges 58 are glued onto opposite ends of a cylindrical paper core 82 to form the finished reel 80 shown in FIG. 9. Preferably, the die-cut and molded reel flanges 58 are sized to force fit onto either end of the paper core 82, and adhesive may also be used to secure the flanges 58 to the core 82. No clamps are necessary to maintain the force fit of the flanges 58 onto the paper core 82 while the adhesive is setting.

EXAMPLE 2

Appliance Base

Figure 10:
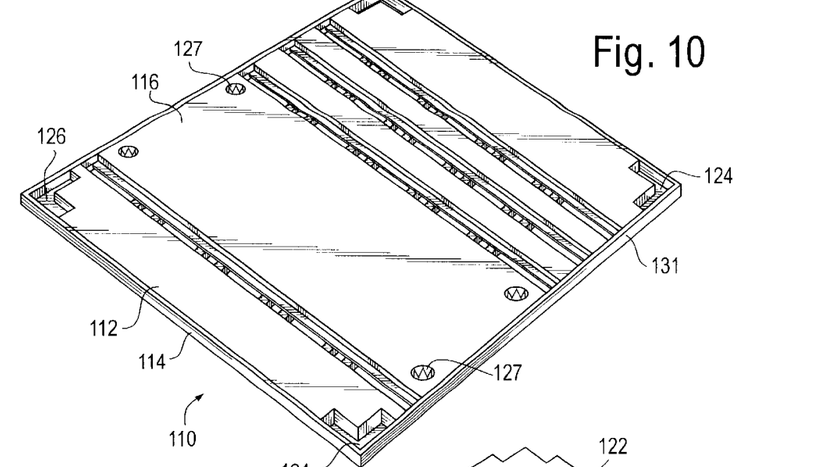
FIG. 10 is a perspective view of an appliance base made according to the present invention.
Figure 11:
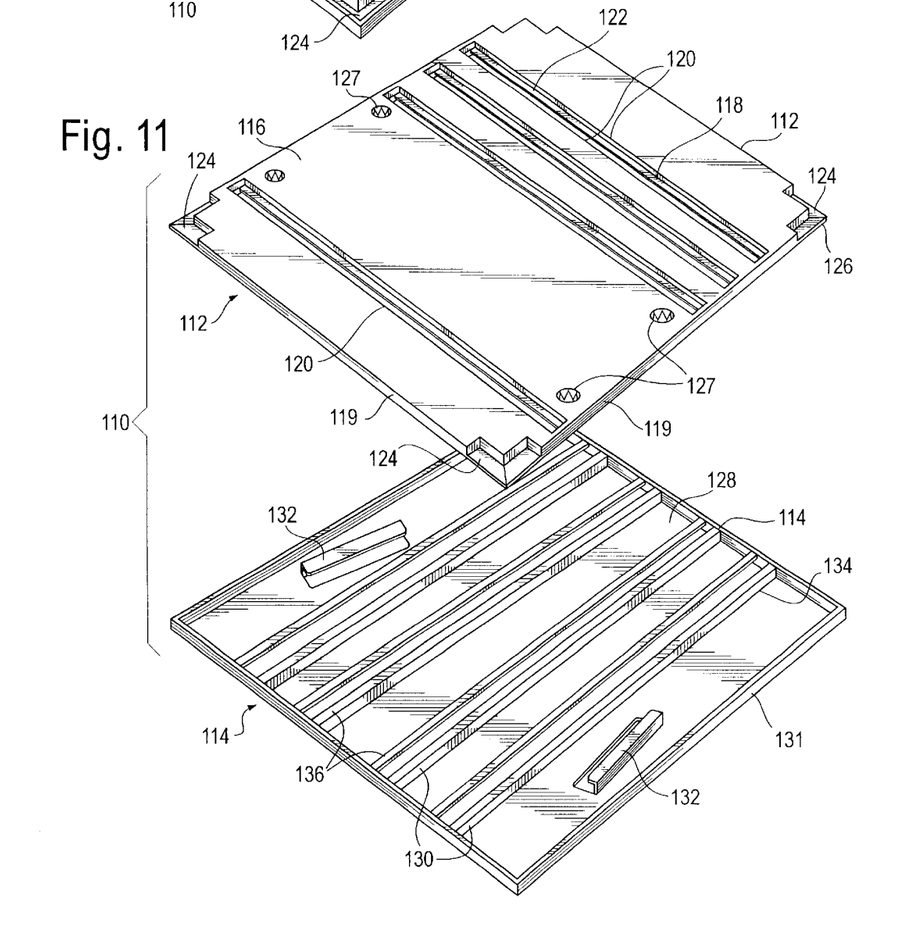
FIG. 11 is an exploded perspective view of the appliance base of FIG. 10 showing the top and bottom members.

Turning to FIG. 10, there is shown another product made from assembled three-dimensional paper laminate structures made according to the present invention. The product is an appliance base 110, and like the reel flange shown in FIG. 7, it comprises two three-dimensional laminated paper structures bonded together. As best shown in FIG. 11, the two structures are a top laminated paper member 112 and a bottom laminated paper member 114. Appliance bases are used to carry large appliances through the manufacturing and distribution stages.

The top member 112 of the appliance base 110 comprises a substantially planar rectangular surface 116, a plurality of struts 118 formed out-of-plane with respect to the planar surface 116, and downwardly extending side walls 119 formed along all four ends of the rectangular planar surface 116. In the illustrated embodiment, each strut 118 is only about half the height of the side walls 119 and is connected to the planar surface 116 along a rigid fold line 120. Each strut 118 has an additional fold which forms a tab 122 disposed in approximately parallel relationship to the planar surface 116. As described more fully below, the struts 118 are perpendicular to and abut the struts 130 formed in the bottom member 114 of the assembled appliance base 110.

The top member 112 further comprises corner recesses 124 for accommodating corner posts (not shown). The bottom surfaces 126 of the corner recesses 124 are bonded directly onto the planar surface 128 of the bottom member 114 so that cornerpost loading, as might occur when appliance packages are stacked on top of one another, is transferred directly through the base 110. Preferably the bottom surfaces 126 are flat for full transfer of the cornerpost load. Because it is solid, the laminated paper material under the cornerpost does not crush under the cornerpost load as can happen with corrugated or other hollow structures.

The top member 112 further comprises optional floor leveler recess holes 127 to accommodate leveler screws (not shown) where they are used, such as with dishwashers. In the assembled base 110, the floor leveler recess holes 127 are located at either end of the bottom member flanges 132 described in more detail below.

In the illustrated embodiment the top member 112 has three struts 118 on one side of the floor leveler recess holes 127 and a fourth strut 118 on the opposite side of the recess holes 127. This configuration of struts is intended for illustrative purposes only; many other strut configuration are contemplated.

The bottom member 114, like the top member 112, comprises a substantially planar rectangular surface 128, a plurality of struts 130 formed out-of-plane with respect to the planar surface 128, and upwardly extending side walls 131 formed along all four ends of the rectangular planar surface 128. In addition, the bottom member 114 has two flanges 132 located near opposing ends of the planar surface 128 facing upwardly toward the top member 112.

As with the top member struts 118, the height of the bottom member struts 130 is only about half the height of the bottom member side walls 131. Each bottom member strut 130 is connected to the planar surface 128 along a rigid fold line 134. Each bottom strut 130 has an additional fold which forms a tab 136 disposed in approximately parallel relationship to the bottom member planar surface 128. The tabs 136 are to be bonded to opposing tabs 122 formed in the top member to form the assembled appliance base 110. Unlike the struts 130, the flanges 132 extend the full height of the side walls 131 and are to be bonded to the top member planar surface 116.

To assemble the appliance base 110, the top and bottom members are brought together until the opposing sets of tabs 122, 136 meet. The tabs are bonded to each other to form a rigid structure. The upwardly extending bottom member flanges 132 are bonded to the facing planar surface 116 of the top member 112 directly beneath the support frame of the appliance. In production, the appliance is typically attached to the appliance base by screws. Bonding the flanges 132 to the top member 112 directly beneath the appliance increases the thickness of the appliance base 110 where the screws are inserted, thus providing increased screw holding resistance as well as providing support for the appliance.

The top member side walls 119 fit snugly within the bottom member side walls 131 and may be bonded thereto to provide shear resistance for inplane bending and side impact strength. The corners of the top member 126 fit inside the bottom member side walls 131. Significantly, the bottom member struts 130 do not extend completely from one side wall to the opposite side wall. There is a narrow gap between the struts 130 and the side walls 131 to accommodate the top member side walls 119.

In the assembled appliance base 110 the top member struts 118 and the bottom member struts 130 run perpendicular to each other the length of the appliance base 110 and act to strengthen and cushion the base 110 against side impacts in any of the four horizontal directions, as well as against vertical (compression) forces. The struts are intended to resist clamp loading forces exerted in either direction by clamp trucks.

Analogous to FIGS. 2 and 3, FIGS. 12 and 13 show single paper sheets 140, 150 which have been die-cut in preparation for making appliance base top and bottom members respectively. Die-cuts 142, 152 are made around part of the periphery of those sections that will be formed out-of-plane to make the struts for the top and bottom members respectively.

Figure 12:
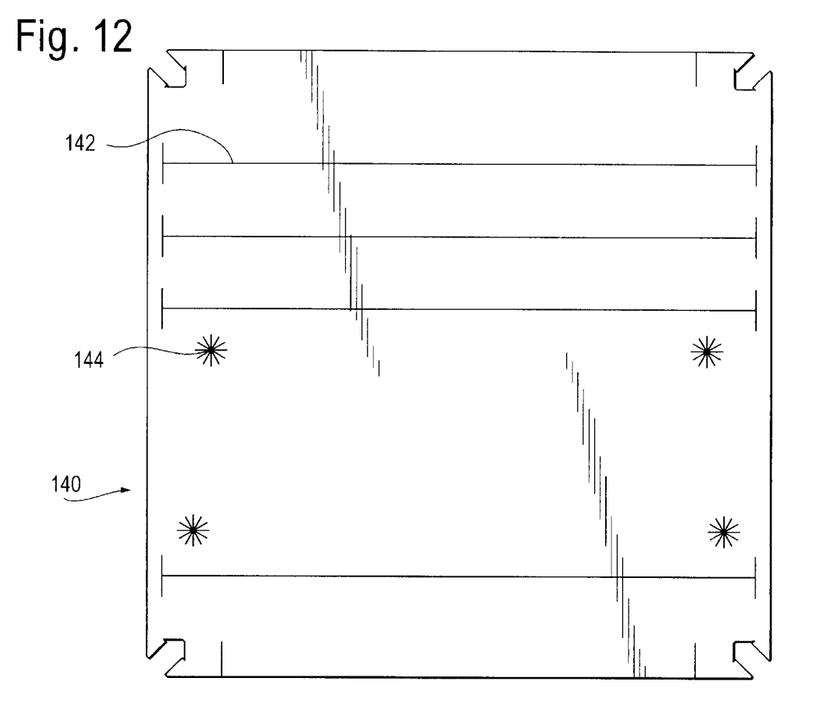
FIG. 12 is a top plan view of a paper sheet die-cut to form the top member of FIG. 11.

In FIG. 12 a plurality of linear die-cuts 144 intersect at their approximate midpoint and each has a substantially equal angular displacement from adjacent diecuts. These die-cuts define substantially triangular-shaped sections that will be formed out-of-plane to create the floor leveler recess holes 127 in the laminated top member 112. By die-cutting the paper sheets into the shape shown in FIG. 12, side walls 119 and corner recesses 126 may be formed out-of-plane with a punch and die assembly in a process similar to that described above with respect to the reel flange.

Figure 13:
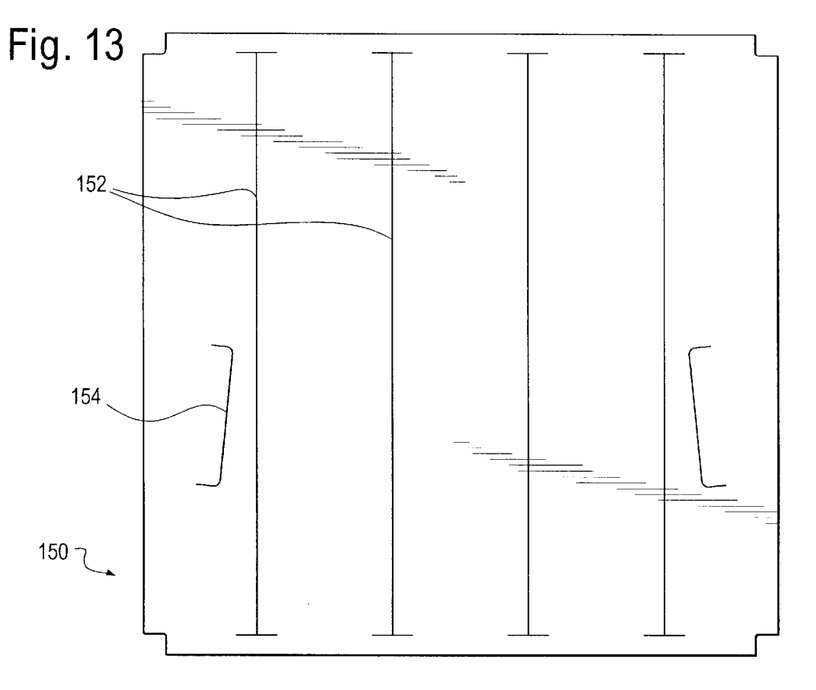
FIG. 13 is top plan view of a second paper sheet die-cut to form the bottom member of FIG. 11.

As already noted, the paper sheet 150 shown in FIG. 13, which together with other similarly-cut paper sheets forms the appliance base bottom member 114, comprises partial die-cuts 152 around the perimeter of those sections to be formed out-of-plane to form the struts 130. Additional partial die-cuts 154 are made in the paper sheet 150 around the periphery of sections to be formed out-of-plane to form the two flanges 132. Die-cutting the paper sheets 150 into the shape shown in FIG. 13 allows the side walls 131 to be formed out-of-plane, leaving a substantially rectangular planar surface.

In a manner similar to that described above with respect to the reel flange components, after die-cutting the paper sheets of FIGS. 12 and 13, multiple sheets are aligned and bonded together to form a flat laminate and, before the bonding material sets, formed into a three dimensional structure using a punch and die assembly.

Figure 14:
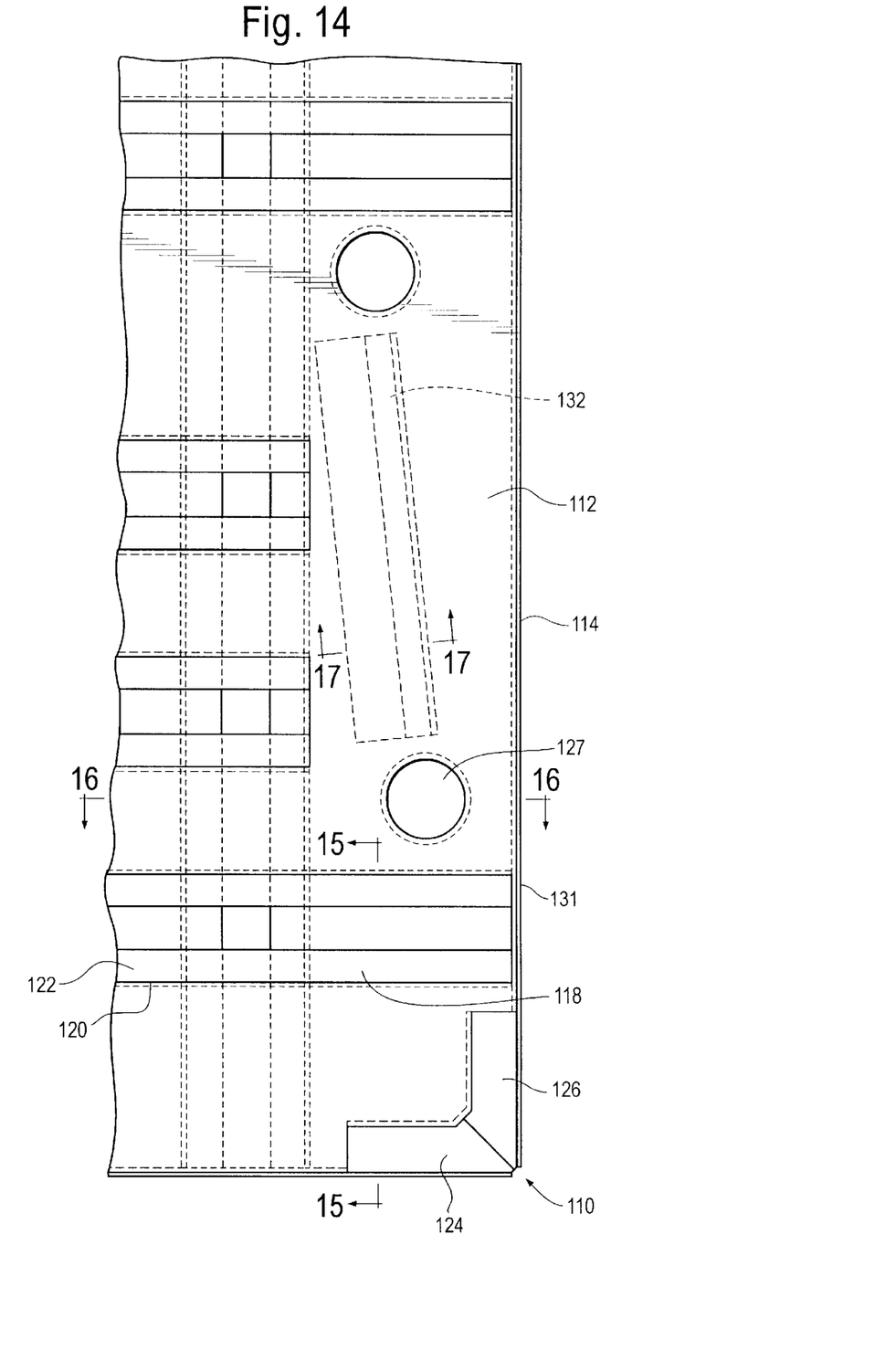
FIG. 14 is an enlarged top view of a section of the appliance base of FIG. 10.
Figure 15:
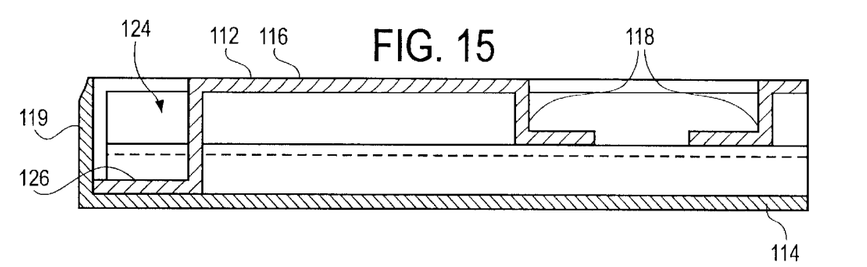
FIG. 15 is a cross-sectional view of the appliance base of FIG. 14 taken along line 15—15.
Figure 16:
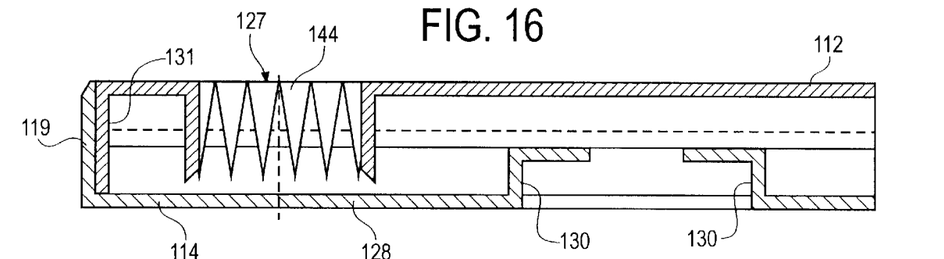
FIG. 16 is a cross-sectional view of the appliance base of FIG. 14 taken along line 16—16.
Figures 17, 18, 19:
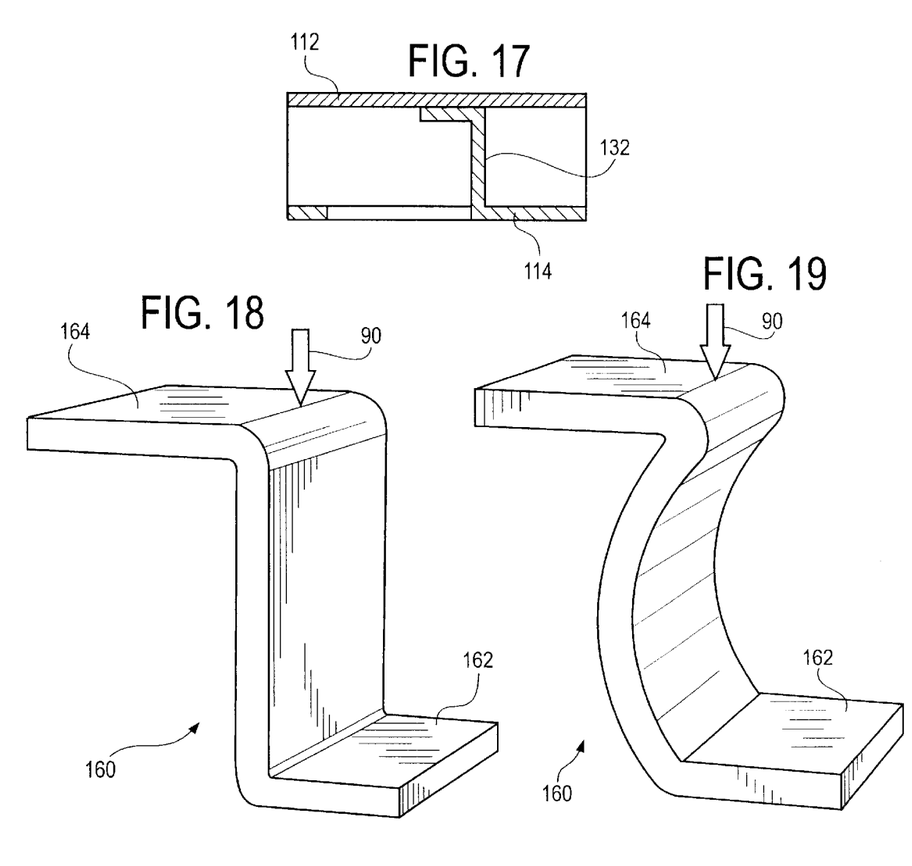
FIG. 17 is a cross-sectional view of the appliance base of FIG. 14 taken along line 17—17.
FIGS. 18–22 are perspective views of five possible strut configurations according to the present invention.

In order to better understand how the top and bottom members 112, 114 are joined together, attention is directed to FIGS. 14–17. FIG. 14 is an enlarged top view of a section of the appliance base 110 of FIG. 10. FIGS. 15, 16 and 17 are cross-sections of FIG. 14 taken along lines 15—15, 16—16 and 17—17 respectively. It can readily be seen in FIGS. 15 and 16 that the struts 118, 130 are about half the height of the side walls 119, 131. As shown in FIG. 15, the bottom surface 126 of the top member corner recess 124 lies flat against the bottom member 114. As shown in FIG. 17, the flanges 132 extend the full length from the bottom member 114 to the top member 112 where they are bonded thereto.

The preceding examples are illustrative only. The struts, for instance, can be designed for specific structural and performance characteristics by varying their shape and the angle formed by the struts and the planar surface.

Figure 20:
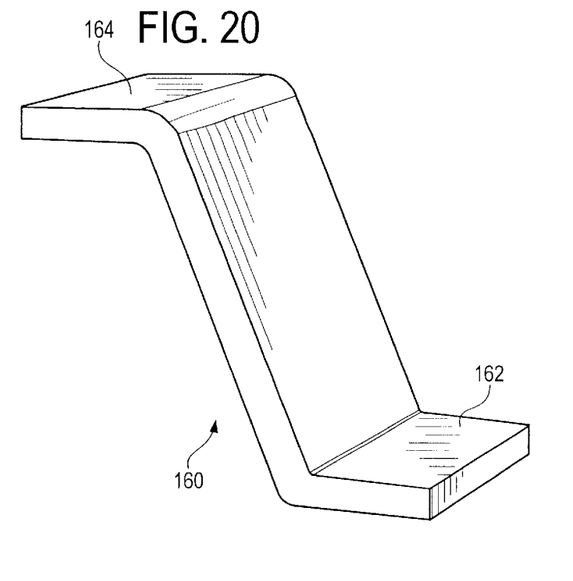
Figures 21, 22:
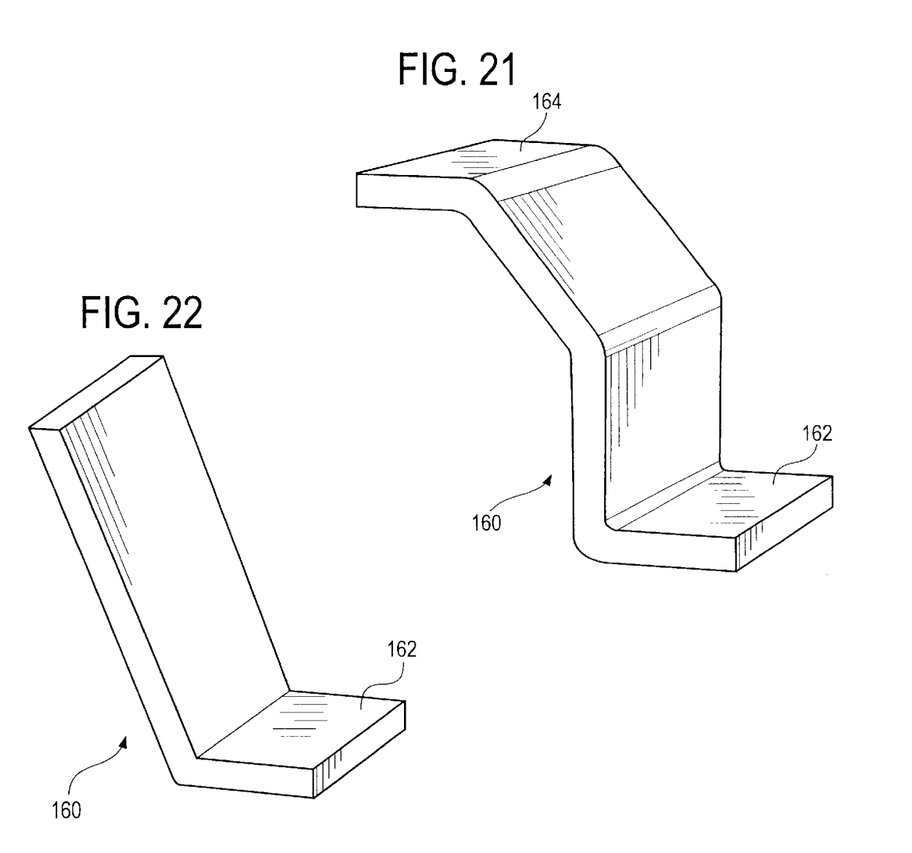

FIGS. 18–22 show five possible shapes for struts formed out-of-plane, and highlight the design flexibility for three-dimensional laminated structures made according to the present invention. FIG. 18 shows the generally squared-off shape of the struts of the flange reel outer member 10 of FIG. 1 and the appliance base bottom member 114 of FIG. 11. FIG. 19 shows an alternative design in which the struts 160 are curved. The strut in FIG. 18 is stiffer and more rigid than the strut in FIG. 19. A load 90 applied in the direction of the arrows in FIGS. 18 and 19 will exhibit different resistance or spring constants on the shapes. FIG. 20 shows a third alternative strut shape in which the strut 160 forms a non-right angle with the planar surface 162. FIG. 21 shows still another strut shape in which the strut 160 has a bend.

In FIGS. 18–21 the struts 160 form tabs 164 that are substantially parallel to the planar surface 162. However the tabs need not be parallel to the planar surface and, as shown in FIG. 22, the struts 160 need not form tabs at all.

The intent of the present invention is to provide three-dimensional structural/cushioning products from laminated sheets and a method of making such products. While the present invention has been described with respect to a reel flange and an appliance base, many other three-dimensional products may be made according to the present invention, including but not limited to furniture, packaging and packaging supports. Furthermore, while the present invention has been described in terms of reel flange members and appliance base members made from multiple sheets, it is anticipated that a three-dimensional laminated structure could be made from a single sheet of die-cut laminated material. In a still further modification of the present invention, instead of gluing multiple three-dimensional laminated structures together, such as the reel flange inner and outer members and the appliance base top and bottom members, different structures can be force fit to make a variety of products using both inside and outside force fits.

Thus an improved three-dimensional laminated structure has been provided. The three-dimensional laminated structure can be die-cut and molded into shapes more complex than those of laminated structures made by conventional methods. The three-dimensional laminated structure has superior strength compared to corrugated structures and many conventional laminated structures. The three-dimensional laminated structure can be designed with specific performance or geometric characteristics that are influenced by the laminate material, laminate fiber orientation, strut placement and strut shape.

Other modifications and alternative embodiments of the invention are contemplated which do not depart from the spirit and scope of the invention as defined by the foregoing teachings and appended claims. It is intended that the claims cover all such modifications that fall within their scope.

I claim as my invention:

1. A method of making a three-dimensional laminated structural component comprising:
   a. cutting multiple layers of paper into a desired planar shape, including at least partially cutting through the periphery of sections that will later be formed out-of-plane;
   b. aligning the multiple layers and the partially cut-through sections and applying a bonding material between the layers to form a laminate;
   c. placing the aligned layers in a forming tool;
   d. before the bonding material sets, forming out-of-plane said sections using the forming tool to make desired structural features connected to the planar surface of the multiple layers along fold lines; and
   e. allowing the laminate to set until the fold lines and structural features are rigid, thereby obtaining a rigid three-dimensional laminated structural component.

2. The method of claim 1 wherein the bonding material is adhesive.

3. The method of claim 1 wherein the bonding material is a thermoplastic polymer, the aligned layers are preheated prior to forming in step (d), and the three-dimensional structural component is allowed to cool during step (e).

4. The method of claim 1 wherein the bonding material is a thermoplastic polymer, heat is applied to the forming tool to allow the polymer to flow and during step (d), and the forming tool is allowed to cool to set the polymer during step (e).

5. The method of claim 1 wherein the desired structural features include one or more struts shaped to provide a specific load resistance.

6. The method of claim 1 wherein some of the desired structural features are configured to receive in a close fitting relationship a portion of another three-dimensional structure.

7. The method of claim 1 wherein each layer of paper has a perimeter and a perimeter portion adjacent the perimeter, the cutting step includes cutting out sections from the perimeter portion of each layer of paper, and the forming step includes forming out-of-plane the perimeter portions of the aligned multiple layers to make a substantially continuous edge.

* * * * *

UNITED STATES PATENT AND TRADEMARK OFFICE
CERTIFICATE OF CORRECTION

PATENT NO. : 6,352,605 B1
DATED : March 5, 2002
INVENTOR(S) : Hunt

It is certified that error appears in the above-identified patent and that said Letters Patent is hereby corrected as shown below:

<u>Title page,</u>
Item [73], Assignee, should read as -- The United States of America as represented by the Secretary of Agriculture --.

Signed and Sealed this

First Day of October, 2002

Attest:

Attesting Officer

JAMES E. ROGAN
*Director of the United States Patent and Trademark Office*